United States Patent [19]

Debortoli et al.

[11] 4,371,757
[45] Feb. 1, 1983

[54] ENCLOSURE FOR OUTDOOR CROSS-CONNECT SYSTEM FOR TELECOMMUNICATIONS

[75] Inventors: George Debortoli, Ottawa; Michael V. Meyerstein, Kanata; Benne Velsher, Nepean, all of Canada

[73] Assignee: Northern Telecom Limited, Montreal, Canada

[21] Appl. No.: 294,838

[22] Filed: Aug. 21, 1981

[51] Int. Cl.³ .............................................. H04Q 1/14
[52] U.S. Cl. ..................................... 179/98; 361/428; 361/426; 174/38; 174/44; 220/3.3; 220/3.8
[58] Field of Search ...................... 179/98, 91 A, 91 R; 361/428, 426, 356; 174/38, 44, 60; 220/3.3, 3.2, 3.8, 3.94, DIG. 25

Primary Examiner—Stafford D. Schreyer
Attorney, Agent, or Firm—Sidney T. Jelly

[57] ABSTRACT

An enclosure for outdoor cross-connection in telecommunications systems has a rectangular housing on a base. One or more columns are mounted in the housing, each column having a channel shaped back portion and a mounting member hinged at one side to one side of the back portion. Connectors are attached to the mounting member, conveniently by retainers fitting in slots in side walls of the mounting member, latch members holding the retainers in position. Connectors clip into the retainers and can be sealed by sealing compound in the retainers. Cable conductors pass up through the channel shaped back portion, conductors passing through into the mounting members and connected to the rear sides of connectors. Cross-connections are made to the front sides of the connectors.

20 Claims, 23 Drawing Figures

ENCLOSURE FOR OUTDOOR CROSS-CONNECT SYSTEM FOR TELECOMMUNICATIONS

This invention relates to enclosures for outdoor cross-connect apparatus for telecommunications systems.

Cross-connecting in the field, that is external to the Central Office, requires that connections be protected from the environment, be adaptable, easy to use under inclement weather conditions and be unobstructive. Various enclosures exist but suffer from one or more disadvantages. Also it is desirable that cross-connections, or interconnections, between the conductors of incoming cables and the conductors of outgoing cable be readily made, and it is convenient if the various connections can be made in the field. In some conventional enclosures, the connectors are prewired in the assembly shop, and the cable conductors are then connected to these wires by splicing. This is less convenient and it is less easy to change the interconnections.

The present invention provides a cross-connect enclosure requiring access only from one side, for initial connection and for cross-connect connections, with one or more columns carrying connectors, each column comprising a channel section back member or housing and a front mounting member hinged at one side to one side of the back member. Conductors from incoming cables run up the back member and individual groups of conductors pass through apertures in the mounting member, each group then connected to terminals in the back of a connector. Cross-connect wires are inserted in the front of the connector. The cable access ports in the enclosure provide for sealing from the inside of the enclosure. A double skin top, with an air gap between the skins, plus good interior ventilation, maintains the temperature and humidity conditions inside the enclosure substantially the same as outside, avoiding condensation and the like. Various other features are also provided, together with a special terminating fixture which can be used in conjunction with the mounting member for connecting cable conductors and connectors.

The invention will be readily understood by the following description of an embodiment, by way of example, in conjunction with the accompanying drawings, in which:

FIGS. 20 and 20a are views looking upward at the top edges of the enclosure with a door in the open position, illustrating a latch;

Figure 1:
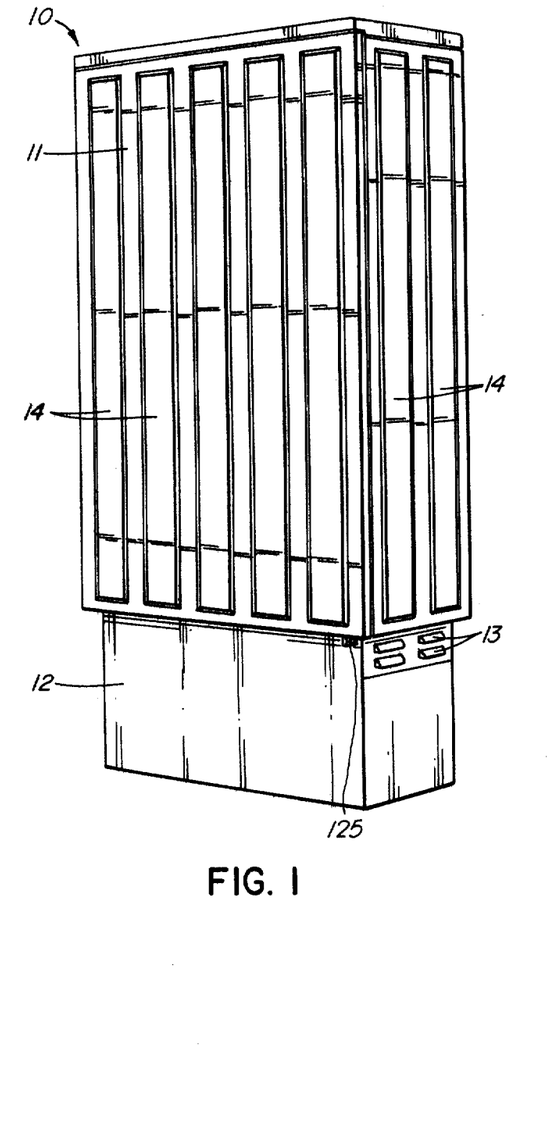
FIG. 1 is a perspective view of one size of enclosure.

FIG. 1 illustrates one size of basic enclosure 10, in the example adapted for pad mounting, that is mounting on a pre-prepared concrete pad. The enclosure is rectangular in cross-section, viewed from the top and the example illustrated has a single door 11 at the front, hinged at one side. The example will hold two columns, as described later with reference to FIGS. 2 and 4. The enclosure can be narrower, to hold one column and also wider to hold three, or four, columns. The wider enclosures usually have two doors hinged at each side, closing at the center. For an alternative form, for pole mounting, the enclosure is generally only of a width to hold one or two columns, although a taller model can also be provided for pole mounting to increase connector capacity.

As seen in FIG. 1, the enclosure 10 includes a base 12 which has ventilation louvers 13, at each end. The panels forming the door, sides and back are ribbed or have recessed portions 14, to improve the appearance, and the base 12 is recessed slightly for the same reason.

Figure 2:
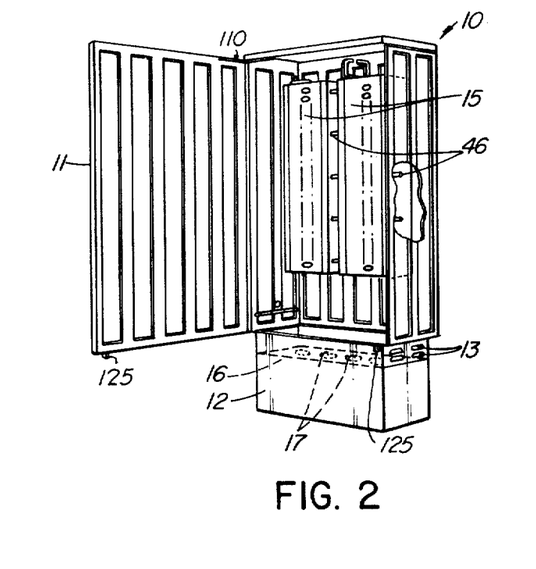
FIG. 2 is a perspective of the enclosure of FIG. 1, with the front open.

FIG. 2 illustrates the interior of the enclosure, with two columns 15 attached to the back wall of the enclosure. The base 12 has a diaphragm or web 16 extending across and provided with apertures 17 therein through which cables can enter the enclosure. The apertures are closed with plugs until needed and sleeves extend down from the apertures. This is described later with reference to FIG. 6. An earthing terminal and braided conductor is provided, indicated at 18.

Figure 3:
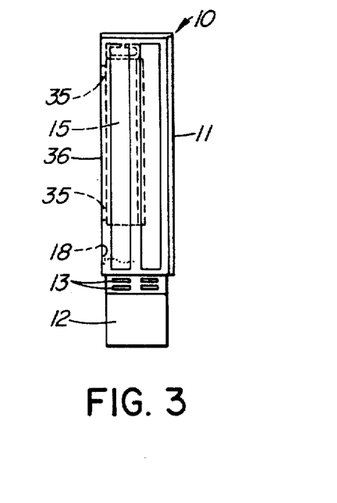
FIG. 3 is a side view of the enclosure of FIGS. 1 and 2.
Figure 4:
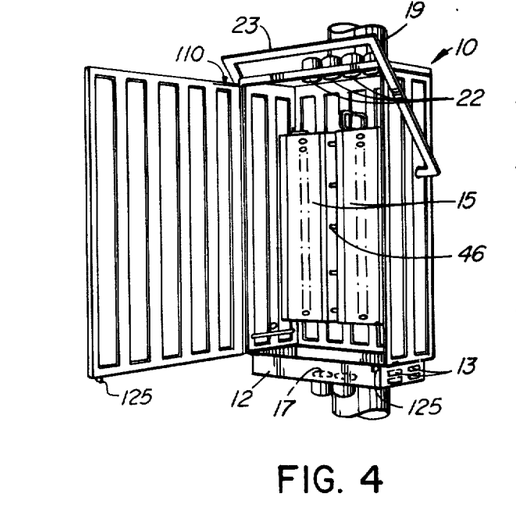
FIG. 4 is a perspective of an enclosure similar to that of FIGS. 1 and 2, but adapted for pole mounting.
Figure 5:
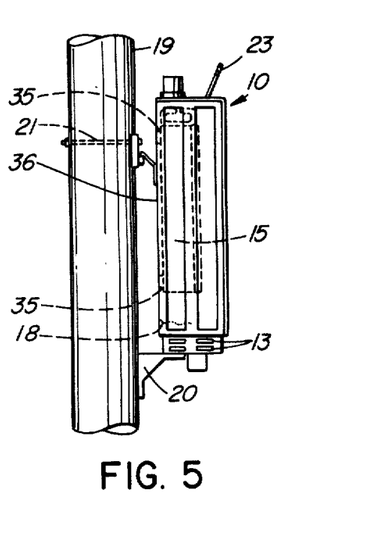
FIG. 5 is a side view of the enclosure of FIG. 4, with side panel reversed.

FIGS. 4 and 5 illustrate a pole mounting version. The enclosure is mounted on the pole 19 by a bracket 20 and a rod 21 passing through the pole, although other ways of attaching the enclosure can be used. The base 12 is shorter, finishing at the level of the web 16 in FIGS. 2 and 3. Apertures 17 are provided in the base, and ventilation louvers 13. Cable entry and exit apertures 22 are also provided in the top of the enclosure, so that cables can be brought in, and taken out through the top or the base or both. The apertures 22 are also closed with plugs until required.

For pole mounted enclosures, it is normal to provide a handle or grip on one side of the enclosure for the telephone linesman to grasp as he climbs up the pole. Usually some form of platform is attached to the pole, just below the enclosure, on which the linesman can stand while working at the enclosure. With a handle on one side it is necessary for the housing to be attached to the pole prior to the metal spike climbing members being driven into the pole. With the present enclosure, a grab bar 23 is provided. The grab bar is attached at its ends to the sides of the enclosure. Preferably the bar extends outwards a short distance from the side before bending upwards. The bar then continues across the top of the enclosure. By this form of grab bar, the pole can be climbed either side and the linesman can grab with either hand, or both hands.

Figures 6, 7, 8:
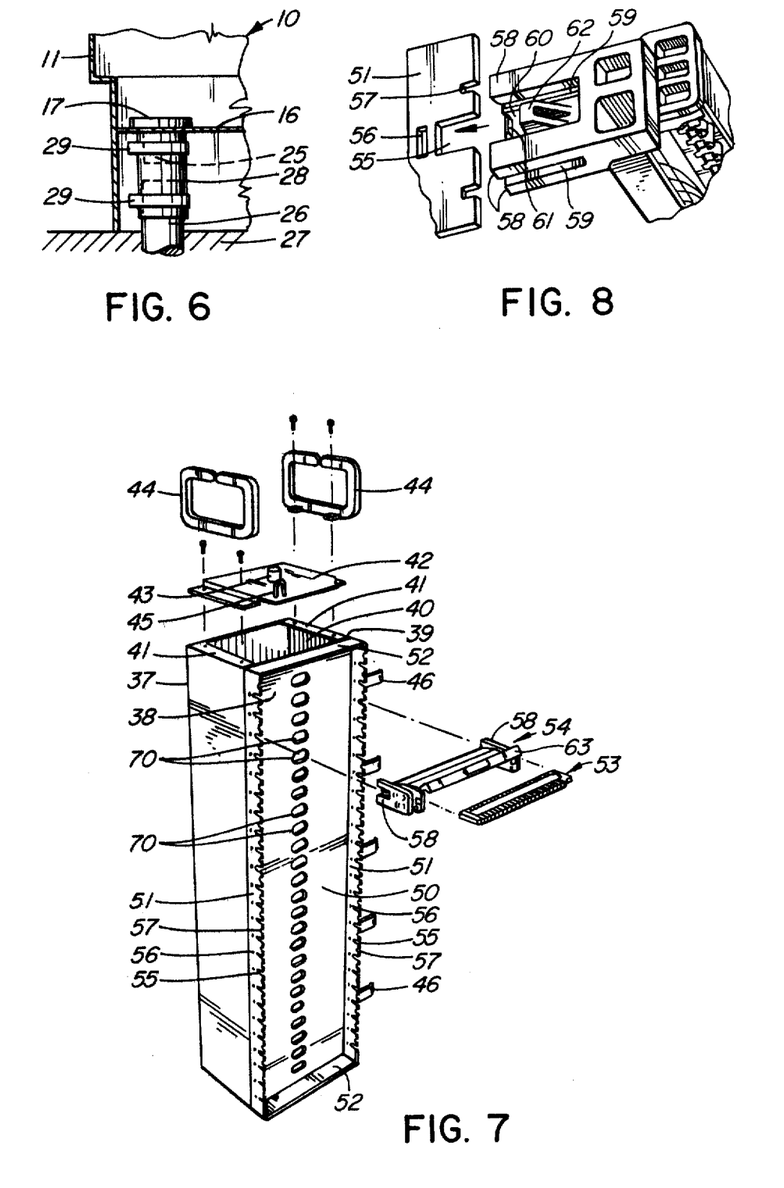
FIG. 6 is an enlarged section through a base of an enclosure illustrating the duct sealing arrangement.
FIG. 7 is a perspective view of a column, illustrating alternative top members and also showing a connector and retainer, in exploded form.
FIG. 8 is a perspective view of a part of a side wall of a mounting member of a column, and a retainer and connector, at an enlarged scale relative to FIG. 7.

The sealing arrangement in the base for pad mounting is illustrated in FIG. 6. From the web 16 a top inner sleeve 25 extends downward. A bottom inner sleeve 26 extends up from the connector pad 27. A loose outer sleeve 28 fits over the top and bottom sleeves and is clamped to these sleeves by clamps 29. The cable extends up thorough the sleeves 25 and 26 into the enclosure. After the cable sheathing has been removed, the conductors divided into groups and passed through parts in the column, then sealant can be fed into the sleeve 25 around the cable, or cables, entering through the sleeve. Thus sealing is done from the inside of the enclosures which is very easy and convenient. Conventionally, sealing is done at the exit from the bottom sleeve 26 which is difficult as this must be done via access below the web 16. In the present example access is required for the initial bolting of the enclosure to the pad 27 and for tightening the clamps 29. This is done via a removable front panel, or panels, on the base 12. After the enclosure is fixed in position and the sleeves 28 clamped in position, all future access is via the normal door, or doors, of the enclosure, as the panels are attached from the inside. Plugs are removed only from those apertures 17 being used. The cables are sealed after pulling through, as described above. At a later time, if additional cables are added through further apertures 17, then sealing is readily done at that time.

The columns 15 are attached to the back of the enclosure, small brackets 35 being attached to the back wall 36 of the enclosure and bolts passing through holes in the back wall of the column and into captive nuts in the brackets 35.

FIG. 7 illustrates a column 15 in more detail. A column comprises a channel shaped back member or housing 37 and a front mounting member 38 hingedly attached at one side, at 39, to a side wall 40 of the housing 37. The top edges 41 of the side walls of the housing 37 are bent inwards. Either a substantially flat top member 42 having a central pivot member 43 is screwed to the edges 41, or two distribution rings 44 are screwed to the edges 41. A coil of interconnect wire can be mounted on the pivot member 43, the wire being led out through a loop 45. The arrangement generally is that with only one column, a flat top member 42 is provided. For two or more columns, the column at, for example the left side is provided with a top member 42, the remaining columns being provided with rings 44. However this arrangement can be varied. Retaining rings 46 are provided for guidance and retention of cross-connect (or inter-connect) conductors, as described later.

The mounting member 38 is of shallow dish shape, having a back panel or web 50 and forward extending side edges or walls 51 and top and bottom edges or walls 52. A column is intended to carry or mount a predetermined number of connectors, for example twenty-four. Each connector provides for terminating a predetermined number of pairs of conductors, for example twenty-five. Each connector, one of which is indicated at 53, snaps into a retainer, one of which is indicated at 54. Each retainer snaps on to the side edges or walls 51. The retainers are conveniently of the form as described in application Ser. No. 294,836 filed Aug. 21, 1981 in the name of the present assignee, the disclosure of which is included herein by specific reference.

As seen in FIG. 7, and in more detail in FIG. 8, the side walls 51 have a plurality of large slots 55, a slot for each retainer, the slots extend part way into each side wall and a rectangular hole or aperture 56 is formed inward of each slot 55. Adjacent to each slot 55 is a smaller slot 57. As described in the above-mentioned application, and as illustrated in FIG. 8, a retainer has spaced pairs of legs 58 at each end, defining slots 59. The legs of each pair are spaced apart and between the legs, at each end, is a flexible latch member 60. The latch member has a rib 61 near the outer end and a guide 62. When a retainer is mounted on a mounting member, the side walls 51 enter the slots 59 between the pairs of legs, the guide 62 entering one of the slots 55, the latch member on the inside of the side wall. As the rib 61 meets the end of the slot 55, the latch member is deflected inward and then on further movement of the retainer on to the side walls, the rib snaps into the rectangular hole 56. This occurs at each end and holds the retainer securely in position. A retainer is released by pressing on the guides 62 to unlatch the ribs 61 from the holes 56.

A connector 58 fits into a retainer, being held in position by small protrusions, not seen, which snap into recesses in the connector. Each retainer has a lid 63 which snaps down over the connector.

An aperture or port 70 is provided in the back panel or web 50 for each retainer and connector. The conductors for a particular connector are fed through the related aperture 70. The mounting member 38 is retained in position on the back member or housing 37 at the side opposite to the hinge side by a screw at top and bottom passing through the back panel or web into captive nuts on the back member or housing. Release of these screws enables the mounting member to be hinged forward. This is seen in FIG. 9.

Figure 9:
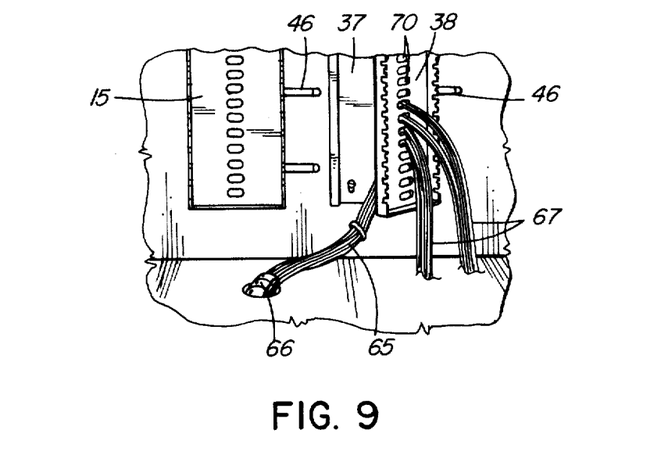
FIG. 9 is a front view of the lower part of an enclosure, illustrating the hinging of a mounting member.

In FIG. 9, the left hand mounting member is in the closed position on its backing member or housing. The right hand mounting member has been hinged forward, enabling the conductors 65 from cable 66 to pass up inside the channel formed by the back member or housing, the individual groups of conductors, indicated at 67, being passed through the apertures 70. After the conductor groups have been passed through the ports 70, the mounting member 38 is hinged back and fastened to the back member or housing 37. The conductors 67 can then be terminated in a connector.

Various ways of terminating the conductors in a connector can be used, but a particularly convenient way is illustrated in FIGS. 10 to 15.

Figure 10:
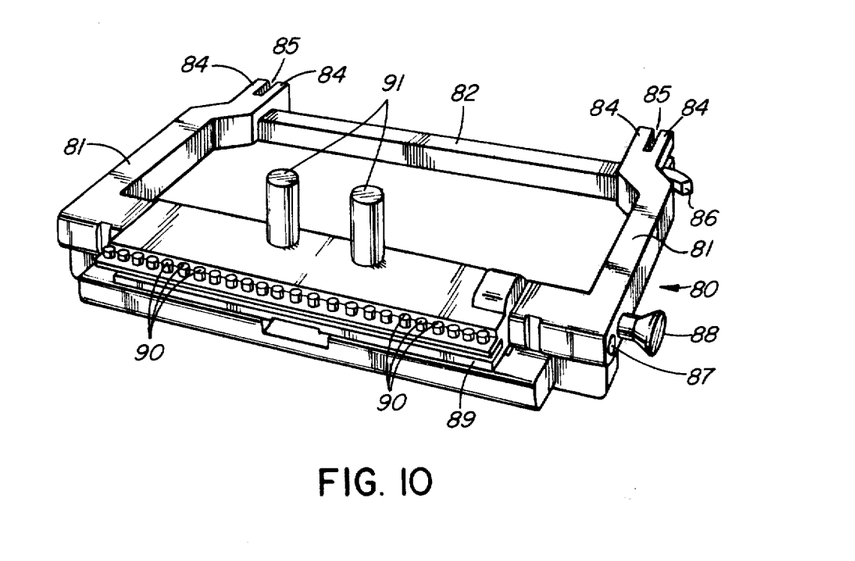
FIG. 10 is a perspective view of a tool for holding a connector while attaching one set of conductors thereto.

FIG. 10 illustrates a tool or holding member 80, for mounting on a column and holding a connector for connection of conductors thereto. The tool is of open frame structure, having two side members 81, a rear member 82 connecting the rear ends of the side members, and a front member 83 rotatably mounted between the front ends of the side members. The rear ends of the side members are extended beyond the rear member 81 and are in the form of spaced legs 84 forming slots 85. The rear ends form a similar structure to the legs 58 and slots 59 of the connector, as illustrated in FIG. 8. Instead of a flexible latch member a pivoted latch member 86 is provided, at each side, to hold the tool on the column.

The front member 83 is mounted on pivots 87 in the forward ends of the side members and is locked in one or other of two positions by a spring loaded plunger 88. The front face 89 of the member 83 accepts a connector and on the forward edge of the top surface are a plurality of small protrusions 90. Two large protrusions 91 extend up from the top surface, towards the rear of member 83.

Figure 11:
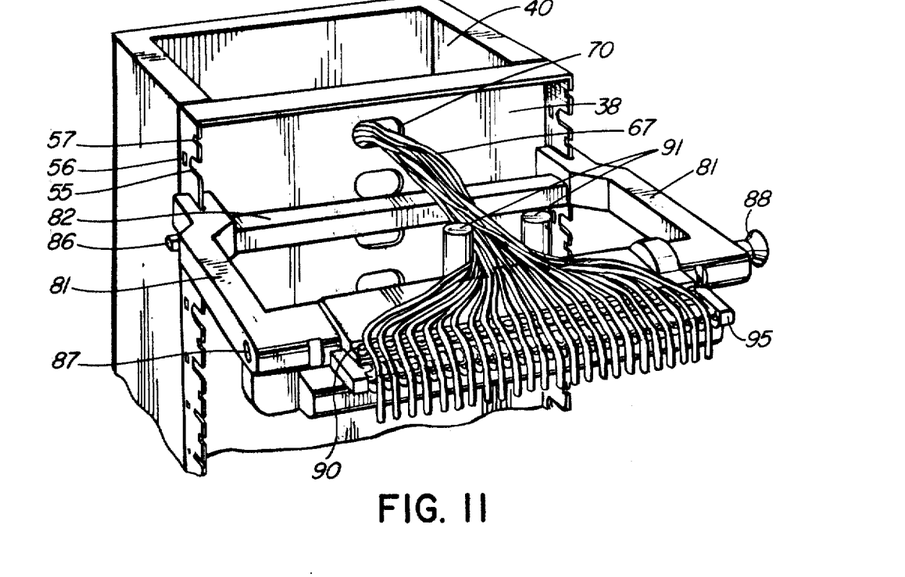
FIGS. 11 and 12 illustrate two steps in attaching conductors.

FIG. 11 illustrates a tool 80 mounted on a column mounting member 38. The legs 84 fit over the side walls 51 and the latch members 86 engage in the rectangular holes 56. A group of conductors 67 is passed through an aperture 70 at a level corresponding to that at which a connector is to be mounted. Normally connection starts at the top of a column and therefore the conductors 67 are passed through the top aperture 70 and the tool 80 is mounted on the second pair of slots 55 down from the top. A connector 95 is pushed into the front face 89 of the front member 83 and the conductors 67 brought forward, individual pairs of conductors are positioned between protrusions 90, and lead downward over the connector 95.

Figure 12:
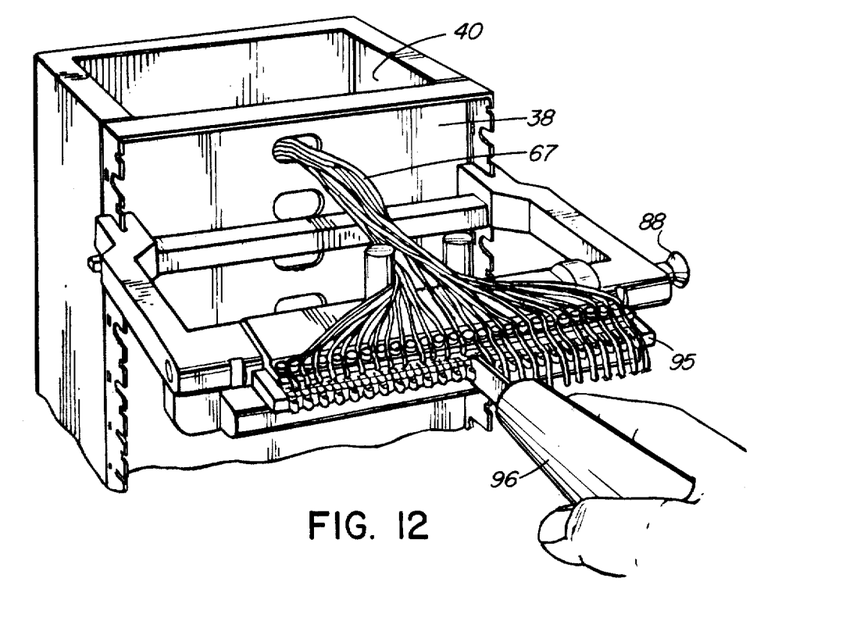

An insertion tool is then used to insert the individual conductors into slots in the connector and into terminals in the connector. The tool, illustrated in FIG. 12, at 96, has a blade 97 which pushes the conductor down into the terminal, for electrical connection thereto. The terminal is conveniently of the insulation removing form as described in U.S. Pat. No. 4,602,391. After the conductor has been fully inserted, the tool can cut off the excess conductor end. This is seen in FIG. 12.

Figure 13:
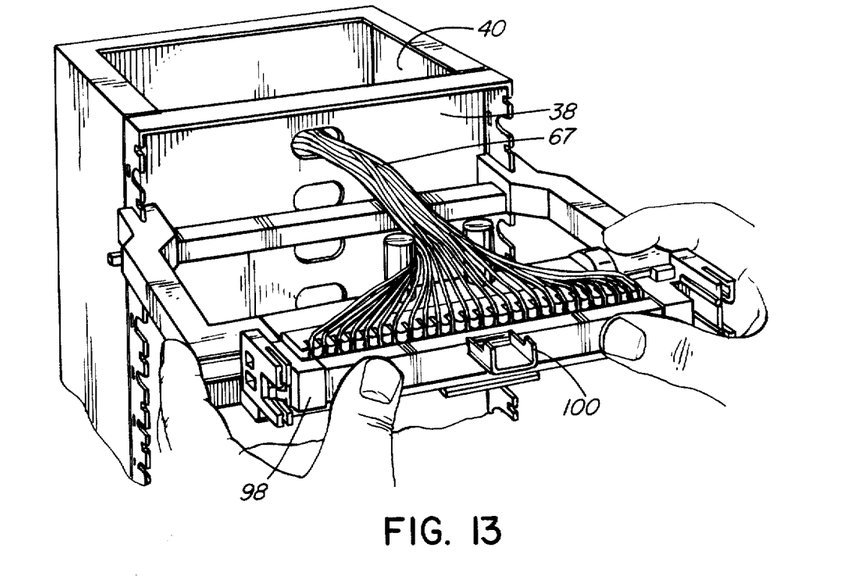
FIG. 13 illustrates the attachment of a retainer to the connector.
Figure 14:
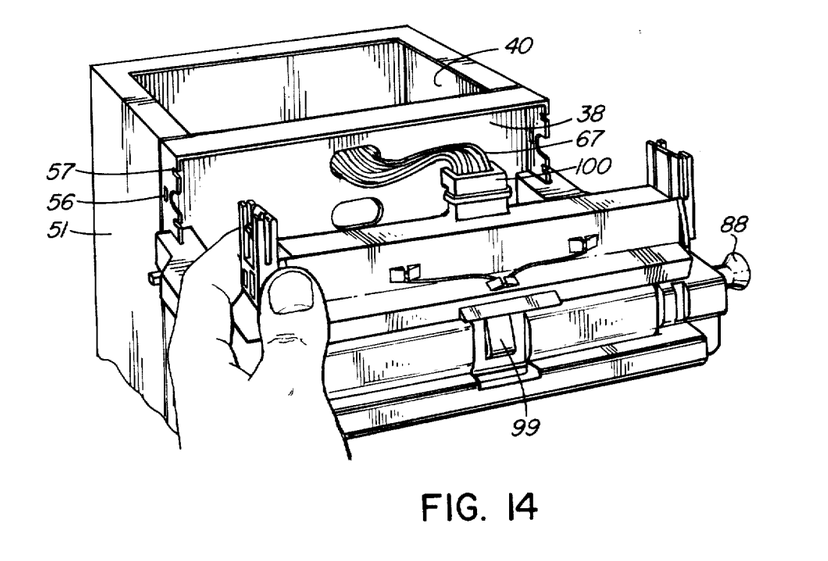
FIGS. 14 and 15 illustrate two steps in removing a retainer and connector from the tool and attaching to a column.
Figure 15:
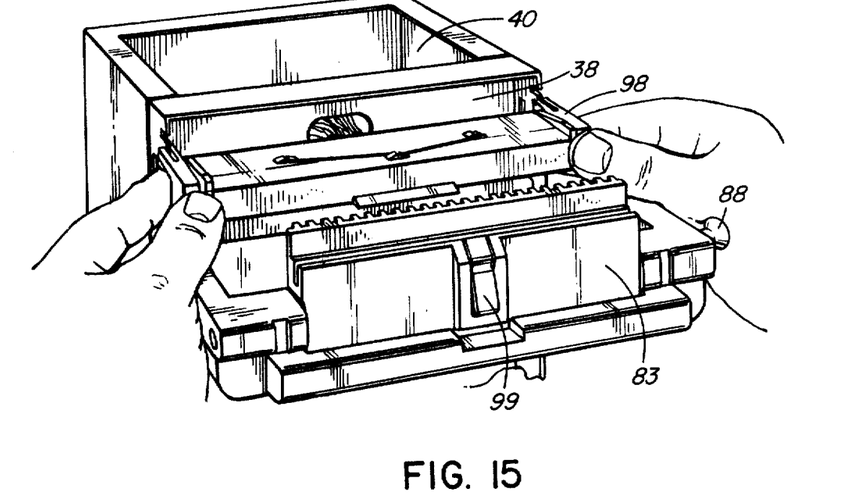

After all the conductors have been inserted in a connector, a retainer is clipped on over the connector. This is illustrated in FIG. 13, the retainer indicated at 98. Once the retainer is attached to the connector, the latch 88 is pulled out and the front member 83 rotated, clockwise as looked at at the right hand end in FIG. 13, the latch 88 re-engaging when the front member has rotated through 90°. The conductors 67 are then drawn together and "tied" to the strain relief member 100. The connector and retainer are now extending upwards, as seen in FIG. 14. The connector and retainer are then removed from the member 83 by lifting upwards, and then rotated through a further 90° and mounted on the mounting member 38. The slots 59 (FIG. 8) at the ends of the retainer fit over the sides 51 of the mounting member, with the guides 62 in the slots 55, the ribs 61 engaging in the holes 56. This step is illustrated in FIG. 15. A spring catch 99 can be used to hold the connector in the front member 83, the catch released to remove connector and retainer.

The front member 83 is rotated back to its original position, by release of the latch 88. The tool 80 is then removed from the mounting member 38 by releasing the latches 86. The tool is normally repositioned on the mounting member 38 at the next pair of slots 55 down. The procedure of inserting a connector, inserting conductors, applying a retainer and so on is repeated. This procedure is repeated for the whole series of slots 55, assuming a column is to be completely filled. When the bottom position is reached it is necessary to remove the tool from the mounting member 38 before the connector and retainer are mounted, as the tool will be occupying the bottom slots 55.

Figure 16:
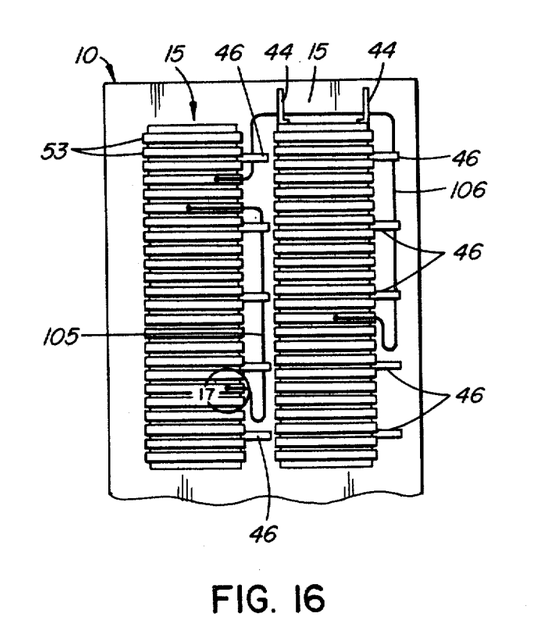
FIG. 16 is a diagrammatic illustration of a two column arrangement with typical cross-connect, or jumper, connections indicated.

With all the connectors installed on a column, it is now ready for interconnection or cross-connection. FIG. 16 illustrates very diagrammatically a two column structure. The connectors are indicated at 53 and in the example, the incoming cable conductors are connected to the top eight connectors in each column and the outgoing cable conductors are connected to the lower sixteen connectors. This particular arrangement can vary. Two cross-connects are shown. One, at 105, cross-connects in the same column, from an incoming pair of conductors to an outgoing pair. The other, at 106, cross-connects from one column to the other, from an incoming pair of conductors on one column to an outgoing pair on the other column. These two cross connections are illustrative only.

Figure 17:
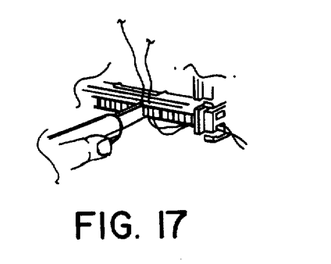
FIG. 17 illustrates insertion of cross-connect conductors.

FIG. 17 is a diagrammatic illustration of a pair of cross-connect conductors being installed. The lid 63 of the retainer 54 is raised to provide access to the edge of the connector and the conductors pushed down into the terminals. The same tool 96 can be used as for the connection of the cable conductors, as in FIG. 12. The interconnect conductors are lead through an aperture 107 and then through the retaining rings 46, and through rings 44 if necessary.

Figure 18:
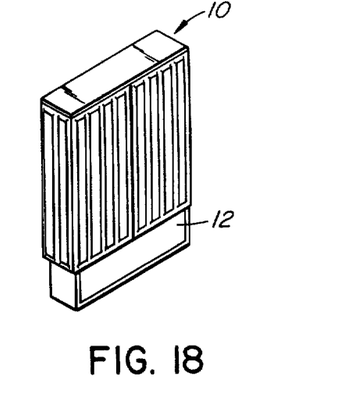
FIG. 18 illustrates a housing having two doors.

As mentioned, wider enclosures can have two doors, and this is illustrated in FIG. 18. Typically an enclosure as in FIG. 18 would have three columns, but housing with four and five columns can also be provided.

Figure 19:
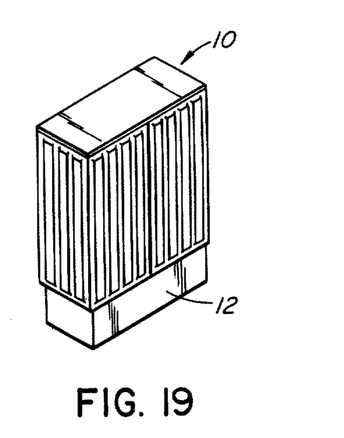
FIG. 19 illustrates a housing which is double sided, with two sets of columns back-to-back.

For a very large capacity, for example 3600 pairs, a back-to-back enclosure can be provided. This is illustrated in FIG. 19. The enclosure 10 is approximately double the depth and columns are mounted back-to-back in the enclosure. Each column would be as in FIG. 7, but extra cable entry and exit apertures would be provided. The columns would normally be mounted on a central wall in the enclosure, but could be fastened back-to-back without an intervening wall, with supports extending to the walls of the housing.

As previously stated, the top of the enclosure is formed of a double skin, that is two panels spaced apart. Vents are provided at the top and also at the bottom of the housing. The bottom vents are seen at 13 in FIGS. 1-5. The vents are covered by screening of fine wire mesh to prevent entry of snow, rain, dust and insects, but at the same time allow a constant air flow through the enclosure. This maintains conditions in the enclosure the same as ambient conditions external to the enclosure and avoids problems due to condensation and similar events.

Figure 20:
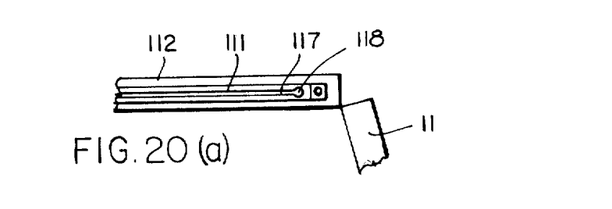
Figure 21:
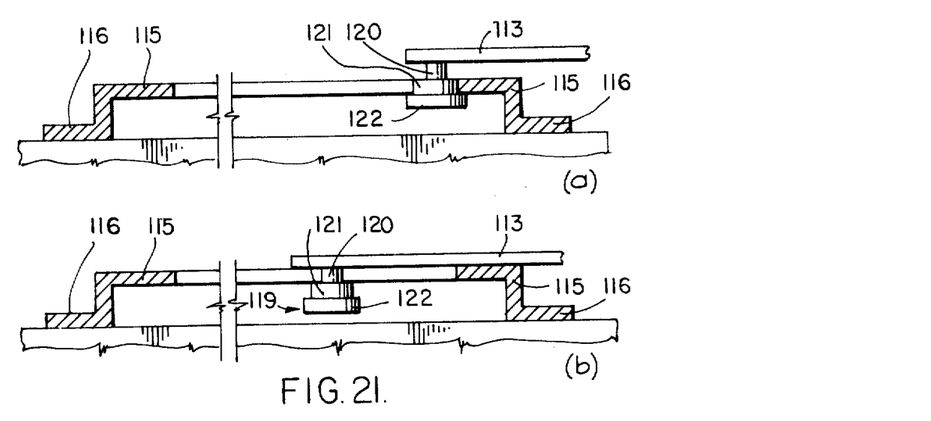
FIGS. 21(a) and 21(b) illustrate two positions of the latching member of the latch.

To maintain the door, or doors, in an open position, a latch is provided. A typical latch is illustrated in FIGS. 20 and 21 in detail, being indicated at 110 in FIGS. 2 and 4. The latch is provided for each door and is at the top. As illustrated in FIGS. 20 and 21, a latch comprises a slotted bracket 111, attached to the inside of the top 112 of the housing at the front edge, and a pivoted latch member 113 pivotally attached at one end 114 to the top edge of the door 11 and engaging with the slotted bracket 111.

The slotted bracket 111 has a central web portion 115 and bent end portions 116 which are attached to the housing top, as by bolts, rivets or welding. The central web portion is spaced from the housing top, as seen in FIGS. 21(a) and (b). Extending along the central web portion 114 is a slot 117, the slot having a circular enlargement 118 at the end nearest to the door.

The latch member 113, at the end remote from the pivotal attachment 114, is a stud 119. The stud has three separate portions of increasing diameter from the latch member 113. Thus there is the smallest diameter portion 120 immediately adjacent to the latch member, the diameter of this portion being an easy sliding fit in the slot 117 of the bracket 111. The next section or portion 121, is of an intermediate diameter, being of a dimension that it rides on the bracket 111 for most of the length but drops into the circular enlargement 118 in the bracket, when the door is at the required open position. A top portion or cap 122 is larger than the circular enlargement 118 to prevent the latch from dropping out of the bracket. The stud 119 is attached to the latch member 113 by any convenient manner, for example having a threaded portion which screws into a threaded hole in the latch member. The latch is released by lifting the latch member upwards to release the portion 121 of the stud from the enlargement 118, and then the door can be closed.

For two doors, a latch is provided each side. Also, rotatable latches are provided on each door, at top and bottom, to latch the doors closed. These are conventional latches and are not illustrated. As a final security measure, brackets are provided on the door, or on each door, and at the bottom of the main housing of the enclosure, indicated at 125 in FIGS. 1, 2 and 4, for the use of a padlock to prevent unauthorized opening of the door, or doors. As the panels in the base are attached from the inside, once the door is closed and locked, no access is possible to the connectors in the enclosure or the cables in the base.

As a further refinement, or convenience panels can be attached to the inside of the door, or each door, for placement of instructions and also for attachment of a clip or other means for holding a clip board. When an installer is installing conductors, particularly the cross-connect conductors, he has instructions on one or more sheets of paper. The ability to attach them to a clip board which in turn is attached to the door, frees his hands for making the cross-connects. In windy weather, holding installation instructions sheets is very inconvenient.

What is claimed is:

1. An enclosure for outdoor cross-connect apparatus, for telecommunications systems, said enclosure comprising:
    a front, back and sides forming a rectangular housing, and a top on said housing;
    at least one column in the housing;
    cable entry and exit means to said housing; and a door in at least said front of said housing;
    said column having a channel shaped back member and a mounting member hingedly attached to the front of the back member;
    said mounting member having a back panel and forward extending side walls, each side wall having a plurality of slots extending part way from a front edge, and an aperture in each side wall inward of and aligned with each said slot, the slots in each side wall aligned in pairs to position connectors extending across the mounting member, a connector at each pair.

2. An enclosure as claimed in claim 1, including a plurality of apertures in said back panel, an aperture for each pair of slots.

3. An enclosure as claimed in claim 1, including a base, the base attached to the bottom of the housing; a web extending across said base; and apertures in said web for entry and exit of cables therethrough.

4. An enclosure as claimed in claim 3, including sealing means for said cables, said sealing means including a top sleeve extending down from said web, an outer sleeve fitting over said top inner sleeve and a clamp for clamping said outer sleeve on to said top inner sleeve.

5. An enclosure as claimed in claim 4, for mounting on a ground pad, further including a bottom inner sleeve for insertion in said ground pad, said outer sleeve also fitting over said bottom inner sleeve, and a clamp for clamping said outer sleeve on to said bottom inner sleeve.

6. An enclosure as claimed in claim 1, including one column in said housing.

7. An enclosure as claimed in claim 1, including a single door in said front.

8. An enclosure as claimed in claim 1, including two doors in said front, a door hingedly attached at each side.

9. An enclosure as claimed in claim 1, including two doors in said front and two doors in said back.

10. An enclosure as claimed in claim 1, said column attached to said back of housing.

11. An enclosure as claimed in claim 1, including at least two columns in said housing, each of said columns having side walls and inwardly extending top edges to said side walls;
    a flat top member attached to said top edges of one of said columns and having a pivot member for support of a wire spool;
    and a distribution ring attached to each of said top edges of the other columns.

12. An enclosure as claimed in claim 1, said top formed of two spaced apart panels, and vents at top and bottom of said enclosure.

13. An enclosure as claimed in claim 1, including means for attachment of said enclosure to a pole.

14. An enclosure as claimed in claim 13, including a grab bar extending up from each side and over the top of said enclosure.

15. An enclosure as claimed in claim 1, including a wall extending across said housing between said sides, intermediate said front and back, a plurality of columns mounted on each side of said wall; two doors in said front and two doors in said back.

16. An enclosure as claimed in claim 1, including a first plurality of columns and a second plurality of columns, the columns mounted back-to-back in said housing, two doors in said front and two doors in said back.

17. An enclosure as claimed in claim 1, including latch means for said door, said latch means holding said door in an open position.

18. An enclosure as claimed in claim 1, including retaining rings on at least one side of a column.

19. An enclosure as claimed in claim 1, including a plurality of connectors in said column.

20. An enclosure as claimed in claim 1, a connector retainer attached to each said aligned pair of slots, and a connector in each retainer.

* * * * *